United States Patent
Cha et al.

(10) Patent No.: US 8,030,373 B2
(45) Date of Patent: Oct. 4, 2011

(54) PIGMENT DISTRIBUTION SYSTEM AND METHOD OF ENCAPSULATING PIGMENT

(75) Inventors: Tae-woon Cha, Seoul (KR); Sung-woong Kim, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 360 days.

(21) Appl. No.: 12/060,471

(22) Filed: Apr. 1, 2008

(65) Prior Publication Data
US 2009/0156730 A1    Jun. 18, 2009

(30) Foreign Application Priority Data
Dec. 17, 2007  (KR) .................. 10-2007-0132685

(51) Int. Cl.
   *C09D 11/00* (2006.01)
(52) U.S. Cl. ........ 523/160; 523/161; 523/200; 523/210; 524/556; 106/31.6; 106/31.65
(58) Field of Classification Search .................. 523/160, 523/161, 200, 210; 524/556; 106/31.6, 31.65
   See application file for complete search history.

(56) References Cited

U.S. PATENT DOCUMENTS

| | | | |
|---|---|---|---|
| RE37,033 E * | 1/2001 | Tajima et al. | 430/196 |
| 6,262,152 B1 * | 7/2001 | Fryd et al. | 524/90 |
| 6,645,681 B2 * | 11/2003 | Andrews et al. | 430/7 |
| 2005/0272834 A1 * | 12/2005 | Ikegami et al. | 523/160 |

OTHER PUBLICATIONS

Huang et al. JACS 1997, 119, 11653-11659.*
Wooley et al. Chem. Commun., 1998, 1415-1416.*

\* cited by examiner

*Primary Examiner* — David Wu
*Assistant Examiner* — Vu A Nguyen
(74) *Attorney, Agent, or Firm* — Stanzione & Kim, LLP

(57) ABSTRACT

Provided is a pigment distribution system. The pigment distribution system includes a pigment encapsulated by physically adsorbing a diblock copolymer to the pigment. The diblock copolymer is represented by Formula 1 below:

<Formula 1>
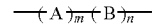

where -A- denotes a hydrophilic monomer, -B- denotes a hydrophobic monomer, m denotes an integer ranging from 1 to 10, and n denotes an integer ranging from 3 to 30, wherein hydrophilic monomers of neighboring diblock copolymer chains are crosslinked using a crosslinker.

13 Claims, 2 Drawing Sheets

PIGMENT DISTRIBUTION SYSTEM AND METHOD OF ENCAPSULATING PIGMENT

CROSS-REFERENCE TO RELATED APPLICATIONS

This application claims the benefit of Korean Patent Application No. 10-2007-0132685, filed on Dec. 17, 2007, in the Korean Intellectual Property Office, the disclosure of which is incorporated herein in its entirety by reference.

BACKGROUND OF THE INVENTION

1. Field of the Invention

The present invention relates to a pigment distribution system having improved dispersion characteristics, an ink composition for fabricating a color filter including the pigment distribution system, a color filter fabricated using the ink composition, and a method of encapsulating a pigment, and more particularly, to a pigment distribution system having improved dispersion characteristics for preventing agglomeration of particles of a pigment, an ink composition for fabricating a color filter including the pigment distribution system, a color filter fabricated using the ink composition, and a method of encapsulating a pigment for preventing agglomeration of particles of the pigment.

2. Description of the Related Art

In the field of display devices, much research has recently been conducted to fabricate display devices using an inkjet printing method. For example, when a color filter of a liquid crystal display (LCD) is formed using an inkjet printing method, precise, reliable, and durable inkjet ink, head structures, systems, and measurement methods are required. One of the most important requirements for inkjet ink is that the inkjet ink should include a durable pigment capable of stably dispersing. To obtain good ink-jettability, a solvent having a high boiling point, such as dipropylene glycol monomethyl ether acetate (DPMA), is used in a pigment distribution system of inkjet ink the viscosity of the inkjet ink is adjusted within a range of about 5 cp to about 25 cp and the surface tension of the inkjet ink is adjusted within a range of about 20 mN/m to about 30 mN/m. To obtain high printing quality, it is required to minimize degradation of the color purity of the inkjet ink caused from dispersants and additives.

When fabricating a pigment dispersed solution, a dispersant can be attached to particles of a pigment by physical or chemical adsorption. The attachment of the dispersant to the pigment particles by chemical adsorption is more physically and chemically stable than when using physical adsorption. However, in the case of chemical adsorption, an additional process such as a dialysis process or a centrifugation process is required to remove byproducts or remaining reactants.

SUMMARY OF THE INVENTION

The present invention provides a pigment distribution system having improved dispersion characteristics.

The present invention also provides an ink composition for fabricating a color filter including the pigment distribution system.

The present invention also provides a color filter fabricated using the ink composition.

The present invention also provides a method of encapsulating a pigment for improving dispersion characteristics of the pigment.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
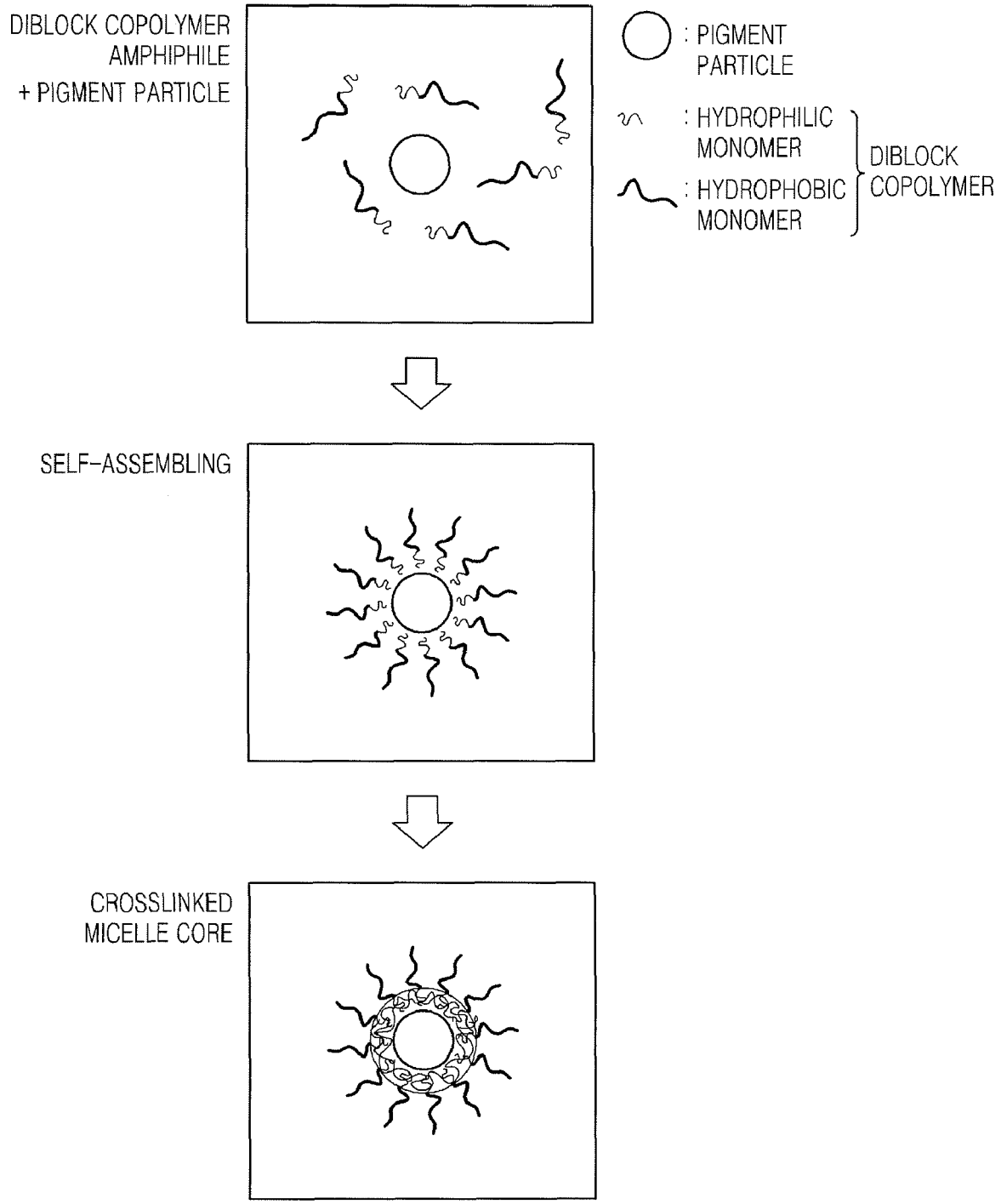
FIG. 1 is a set of diagrams for explaining a method of encapsulating a pigment, according to an embodiment of the present invention.

The present invention will now be described more fully with reference to the accompanying drawings, in which exemplary embodiments of the invention are shown.

The present invention provides a pigment distribution system including a pigment encapsulated using a diblock copolymer to prevent particles of the pigment from agglomerating. The diblock copolymer is coupled to the pigment by physical adsorption.

The diblock copolymer can be represented by Formula 1 below:

<Formula 1> where -A- denotes a hydrophilic monomer, -B- denotes a hydrophobic monomer, m denotes an integer ranging from 1 to 10, and n denotes an integer ranging from 3 to 30, The diblock copolymer may have an $A_m:B_n$ ratio in the range of 1:10 to 1:3.

If the $A_m:B_n$ ratio of the diblock copolymer becomes smaller than 1:10 due to a decrease of the Am content, the diblock copolymer cannot sufficiently adsorb to the particles of the pigment, or the diblock copolymer cannot be sufficiently crosslinked. In this case, the pigment distribution system has a low distribution degree or unstable distribution state. On the contrary, if the $A_m:B_n$ ratio of the diblock copolymer becomes greater than 1:3 due to an increase of the Am content, formation of micelles can be disturbed, and dispersion degree in a solvent can be low. If the $A_m:B_n$ ratio of the diblock copolymer becomes greater than 1:3 due to a decrease of the Bn content, the diblock copolymer has low solvation power due to insufficient hydrophobic groups, thereby decreasing micelle dispersion degree. On the contrary, if the $A_m:B_n$ ratio of the diblock copolymer becomes smaller than 1:10 due to an increase of the Bn content, the diblock copolymer can have high solvation power, and the thickness of micelles can be increased owing to sufficient hydrophobic groups. However, in this case, the bonding strength between the diblock copolymer and the pigment can be lowered.

The diblock copolymer represented by Formula 1 may have a number average molecular weight in the range of about 6400 to about 17600. For example, the number average molecular weight of the diblock copolymer can range from about 8000 to about 12000.

The hydrophilic monomer -A- may be an acrylic monomer including an acid group, an amine group, or an epoxy group. The acid group may be a moiety of an organic acid. Examples of the organic acid include an acetic acid, a butyric acid, a palmitic acid, an oxalic acid, and a tartaric acid.

The hydrophobic monomer -B- may be an acrylic or methacrylic monomer including a methyl group, an ethyl group, a phenyl group, or a benzyl group.

The diblock copolymer represented by Formula 1 encloses particles of the pigment to form micelles. In this case, hydrophilic monomers -A- of neighboring diblock copolymer chains can be crosslinked on the surfaces of the pigment particles using a crosslinker.

In the case where particles of a pigment are encapsulated by physically adsorbing a dispersant to the particles of the pigment, the encapsulated particles are stabilized owing to continuous dynamic equilibrium between the dispersant and the particles. However, since the dynamic equilibrium is largely affected by the concentration of the pigment, the particles of the pigment can agglomerate together when the concentration of the pigment changes due to, for example, dilution. However, in the present invention, micelles are formed by physically adsorbing a diblock copolymer to particles of a pigment, and then the diblock copolymer of the micelles is additionally crosslinked to form topological barriers. Therefore, the above-described problems can be obviated, and stable pigment distribution systems can be provided (refer to FIG. 1)

After encapsulating particles of a pigment using the diblock copolymer represented by Formula 1, hydrophilic monomers -A- of neighboring diblock copolymer chains can be crosslinked using a crosslinker. The crosslinker has functional groups capable of reacting with an acid group, an amine group, or an epoxy group of the hydrophilic monomers -A- of the diblock copolymer. That is, the functional groups of the crosslinker react with acid, amine, or epoxy groups of hydrophilic monomers -A- of neighboring diblock copolymer chains to form crosslinks between the hydrophilic monomers -A-.

The crosslinker can be represented by Formula 2 below:

<Formula 2>

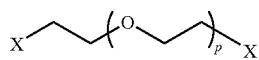

where X denotes an amine group, an acid group, or an epoxy group, and p denotes an integer ranging from 2 to 5.

For example, the crosslinker can be 2,2'-(ethylenedioxy) bis(ethylamine).

The pigment of the pigment distribution system of the present invention can be a well-known pigment, a dispersant-coated pigment, or a combination thereof.

Examples of such pigments include carbon black, graphite, vitreous carbon, activated charcoal, act carbon, anthraquinone, phthalocyanine blue, phthalocyanine green, diazos, monoazos, pyranthrones, perylene, quinacridone, and indigoid pigments. Examples of such dispersant-coated pigment include cabojet-series and CW-series of Orient Chemical. However, the present invention is not limited to the listed pigments and dispersants.

Particles of a pigment are encapsulated by physically adsorbing hydrophilic groups of diblock copolymer chains to the particles. However, in the case of a pigment coated with a dispersant, since surfaces of particles of the pigment are hydrophobic, hydrophobic monomers -B- of diblock copolymer chains physically adsorb to the hydrophobic surfaces of the dispersant-coated pigment particles, and thus hydrophilic monomers -A- of the diblock copolymer chains are placed outward. Then, the outer hydrophilic monomers -A- are crosslinked.

Figure 2:
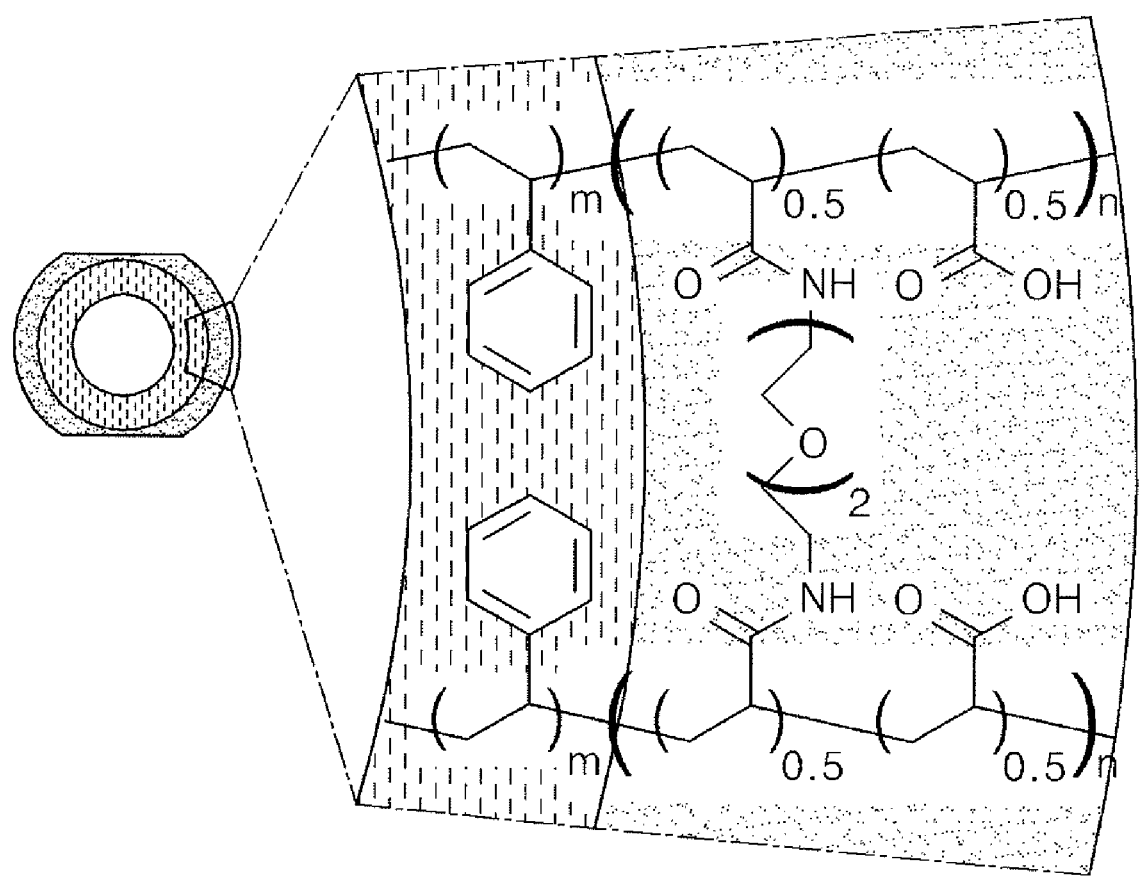
FIG. 2 is an enlarged view illustrating a portion of a micelle of a pigment distribution system according to another embodiment of the present invention.

FIG. 2 is an enlarged view illustrating a portion of a micelle of a pigment distribution system according to an embodiment of the present invention. Referring to FIG. 2, the pigment distribution system according to the current embodiment is formed using a crosslinker having a hydrophilic group and a hydrophobic group, and a dispersant-coated pigment. The hydrophilic group of the crosslinker is an ethylene group having an acetic acid group, and the hydrophobic group of the crosslinker is an ethylene group having a phenyl group.

The ratio of the content of the pigment to the content of the diblock copolymer of the pigment distribution system can be in the range of 1:10 to 1:3. If the pigment:diblock copolymer ratio is below this range, the pigment distribution system is not suitable for use in an ink composition since the viscosity of the ink is increased due to the excessive amount of the diblock copolymer. On the other hand, if the pigment:diblock copolymer ratio is above this range, all particles of the pigment cannot be sufficiently encapsulated, and thus the pigment cannot be sufficiently dispersed.

The present invention further provides a method of encapsulating a pigment. In the method, a pigment, a dispersant having crosslinking groups, and a solvent are mixed to encapsulate the pigment with the dispersant, and a crosslinker is added to the mixture of the pigment, the dispersant, and the solvent so as to crosslink the crosslinking groups of the dispersant.

The solvent may be alcohol, ketone, ester, polyhydric alcohol, lower alkyl ether, a nitrogen-containing compound, a sulfur-containing compound, or a mixture thereof. Examples of the alcohol include methyl alcohol, ethyl alcohol, n-propyl alcohol, isopropyl alcohol, n-butyl alcohol, sec-butyl alcohol, t-butyl alcohol, and isobutyl alcohol. Examples of the ketone include acetone, methyl ethyl ketone, and diacetone alcohol. Examples of the ester include acetaldehyde, ethyl lactate, dipropylene glycol methyl ether acetate (DPMA), diethylene glycol monoethyl ether acetate (EDGAC), propylene glycol methyl ether acetate (PGMEA), 3-methoxybutyl acetate (MBA), and diethylene glycol monobutyl ether acetate (DGMA). Examples of the polyhydric alcohol include ethylene glycol, diethylene glycol, triethylene glycol, propylene glycol, dipropylene glycol, butylene glycol, 1,3-butanediol, 1,4-butanediol, 1,2,4-butanediol, 1,5-pentanediol, 1,2-hexanediol, 1,2,6-hexanetriol, gexylene glycol, glycerol, glycerol ethoxylate, and trimethylolpropane ethoxylate. Examples of the lower alkyl ether include ethylene glycol monomethyl ether, ethylene glycol monoethyl ether, diethylene glycol methyl ether, diethylene glycol ethyl ether, triethylene glycol monomethyl ether, and triethylene glycol monoethyl ether. Examples of the nitrogen-containing compound include 2-Pyrrolidone and N-methyl-2-Pyrrolidone. Examples of the sulfur-containing compound include dimethyl sulfoxide, tetramethylene sulfone, and thioglycol.

In the pigment encapsulating method, particles of the pigment are encapsulated using the dispersant, and the dispersant encapsulating the particles of the pigment is crosslinked.

The pigment may be a well-known pigment, a dispersant-coated pigment, or a combination thereof.

A method of fabricating a pigment distribution system using the pigment encapsulating method will now be described with reference to FIG. 1, according to an embodiment of the present invention. FIG. 1 is a set of diagrams for explaining a method of encapsulating a pigment, according to an embodiment of the present invention The above-described diblock copolymer may preferably be used as a dispersant having a crosslinking group. The diblock copolymer includes hydrophilic monomers Am and hydrophobic monomers Bn. The crosslinking group may be an acid group, an amine group, or an epoxy group of the hydrophilic monomer -A-. The diblock copolymer can be represented by Formula 1 below

<Formula 1> where -A- denotes a hydrophilic monomer, -B- denotes a hydrophobic monomer, m denotes an integer ranging from 1 to 10, and n denotes an integer ranging from 3 to 30, The diblock copolymer can be represented by Formula 1 as described above. Details of the diblock copolymer as represented by Formula 1 above will be understood by referring to the above description.

Referring to the first box of FIG. 1, the pigment, the diblock copolymer, and the solvent are mixed. Then, referring to the second box of FIG. 1, hydrophilic groups of diblock copolymer chains adsorb to particles of the pigment by self-assembling, thereby encapsulating the particles of the pigment. Thereafter, a compound represented by Formula 2 is added to the mixture as a crosslinker.

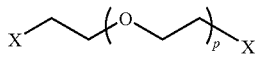
<Formula 2> where X denotes one of an amine group, an acid group, and an epoxy group, and p denotes an integer ranging from 2 to 5.

Next, the crosslinking group of the dispersant, that is, the acid group, amine group, or epoxy group of the hydrophilic monomer -A-, reacts with the group —X— of the crosslinker to form a crosslink. Referring to the third box of FIG. 1, the hydrophilic groups of the diblock copolymer chains are crosslinked around the particles of the pigment. Owing to this structure, a pigment distribution system having a stable dispersion characteristic can be fabricated.

The present invention further provides an ink composition including the above described pigment distribution system for fabricating a color filter.

The ink composition may further include an organic solvent, a binder, a monomer, a dispersant, and an additive.

The solvent may be alcohol, ketone, ester, polyhydric alcohol, lower alkyl ether, a nitrogen-containing compound, a sulfur-containing compound, or a mixture thereof. Examples of the alcohol include methyl alcohol, ethyl alcohol, n-propyl alcohol, isopropyl alcohol, n-butyl alcohol, sec-butyl alcohol, t-butyl alcohol, and isobutyl alcohol. Examples of the ketone include acetone, methyl ethyl ketone, and diacetone alcohol. Examples of the ester include acetaldehyde, ethyl lactate, dipropylene glycol methyl ether acetate (DPMA), diethylene glycol monoethyl ether acetate (EDGAC), propylene glycol methyl ether acetate (PGMEA), 3-methoxybutyl acetate (MBA), and diethylene glycol monobutyl ether acetate (DGMA). Examples of the polyhydric alcohol include ethylene glycol, diethylene glycol, triethylene glycol, propylene glycol, dipropylene glycol, butylene glycol, 1,3-butanediol, 1,4-butanediol, 1,2,4-butanediol, 1,5-pentanediol, 1,2-hexanediol, 1,2,6-hexanetriol, gexylene glycol, glycerol, glycerol ethoxylate, and trimethylolpropane ethoxylate. Examples of the lower alkyl ether include ethylene glycol monomethyl ether, ethylene glycol monoethyl ether, diethylene glycol methyl ether, diethylene glycol ethyl ether, triethylene glycol monomethyl ether, and triethylene glycol monoethyl ether. Examples of the nitrogen-containing compound include 2-Pyrrolidone and N-methyl-2-Pyrrolidone. Examples of the sulfur-containing compound include dimethyl sulfoxide, tetramethylene sulfone, and thioglycol.

Well-known compounds used for manufacturing a color filter ink composition can be used as the binder, the monomer, and the dispersant. The additive may be a viscosity modifier, a leveling agent, a thermal initiator, or a surfactant that is generally used for manufacturing an ink composition. Alternatively, the additive can include two or more of the listed compounds.

The ink composition can be used for manufacturing a color filter by using a printing method. The ink composition has a surface tension in a range of about 15 dyne/cm to about 40 dyne/cm and a viscosity in a range of about 5 cps to about 25 cps at a temperature of about 25° C. If the surface tension of the ink composition is lower than 15 dyne/cm at about 25° C., ink droplets may be undesirably formed during printing. On the other hand, if the surface tension of the ink composition is greater than 40 dyne/cm, satellite ink droplets can be excessively formed. If the viscosity of the ink composition is lower than 5 cps, ink droplets cannot be desirably jetted due to low viscosity. On the other hand, if the viscosity of the ink composition is greater than 25 cps, the ink may not flow well. That is, excessive electricity may be required.

The ink composition of the present invention can be used for fabricating textile and display devices using an inkjet printing method. In particular, the ink composition can be used for fabricating a liquid crystal display (LCD) using an inkjet printing method. Moreover, the ink composition can be used for fabricating display devices such as organic thin film transistor (OTFT) displays and organic light emitting diode (OLED) displays.

The present invention further provides a color filter fabricated using the above-described ink composition. Since the color filter is fabricated using the above-described ink composition having improved pigment dispersion characteristics, the color filter may be precise, reliable, and durable.

The color filter can be fabricated using the ink composition through an inkjet printing method. The inkjet printing method may be a generally-known inkjet printing method such as, for example, forming pixels on a substrate using a black matrix, and then applying the ink composition to the pixels. Thereafter, the substrate is dried and hard-baked, and an over coating layer is formed on the black matrix. In this way, the color filter can be fabricated.

The present invention will now be described in more detail with reference to the following example. However, this example is for illustrative purposes and is not intended to limit the scope of the present invention.

EXAMPLE 3 g of No. 254 red pigment of Ciba, Switzerland, and 1.5 g of poly(acrylic acid)-block-poly(methyl acrylate) (PAA-b-PMA) were wetted by mixing them with 25.5 g of propylene glycol methyl ether acetate (PGMEA) and agitated for three hours. The PAA-b-PMA is a dispersant synthesized by atomic transfer radical polymerization as shown in a scheme below. In the scheme, PtBA (poly-t-butyl acrylate) is repeated 12 to 13 times, and PMA (poly-methyl acrylate) is repeated 40. That is, in Formula 1, m is 12 to 13, and n is 40.

<PAA-b-PMA synthesis scheme>

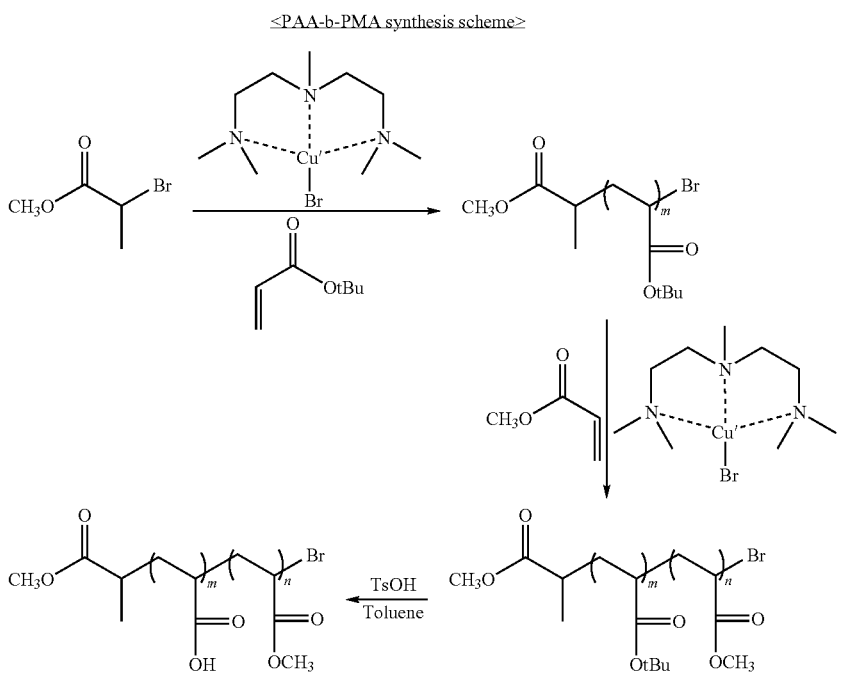

Then, 300 g of sand was added to the mixture, and the mixture was pulverized using a 7-cm disk at 3000 rpm for five hours. Thereafter, the sand was removed from the mixture using a mesh. In this way, a red pigment dispersed solution having an average particle size of about 75 nm was obtained. In the solution, the pigment is encapsulated by the dispersant. Next, 0.1 g of 2,2'-(ethylenedioxy)bis(ethylamine) was added to the solution to crosslink the dispersant. Then, 25 g of curable monomer (dipentaerythritol pentaacrylate), 44.5 g of solvent (dipropylene glycol methyl ether acetate, DPMA), 0.5 of thermal initiator (2,2'-azobis(N-cyclohexyl-2-methyl-propionamide)), and 0.1 g of fluorine based leveling agent were added to the pigment dispersed solution, and then the pigment dispersion solution was agitated using a mixing device for two hours. In this way, an ink composition solution for fabricating a color filter by using a printing method was obtained.

COMPARISON EXAMPLE 3 g of No. 254 red pigment of Ciba, Switzerland, and 1.5 g of polycaprolactone based dispersant were wetted by mixing them with 25.5 g of propylene glycol methyl ether acetate (PGMEA) and agitated for three hours. Then, 300 g of sand was added to the mixture, and the mixture was pulverized using a 7-cm disk at 3000 rpm for five hours. Thereafter, the sand was removed from the mixture using a mesh. In this way, a red pigment dispersed solution having an average particle size of about 75 nm was obtained. Next, 12 g of curable monomer (dipentaerythritol pentaacrylate), 13 g of methyl methacrylate (molecular weight: 10,000, acid value: 30 mgKOH/g), 44.5 g of solvent (dipropylene glycol methyl ether acetate, DPMA), 0.5 of thermal initiator (2,2'-azobis(N-cyclohexyl-2-methylpropionamide)), and 0.1 g of fluorine based leveling agent were added to the red pigment dispersed solution. Thereafter, the pigment dispersion solution was agitated using a mixing device for two hours. In this way, an ink composition solution was obtained.

An ink stability test was performed on the ink compositions of the Example and Comparison Example, and the test results are shown in Table 1 below.

TABLE 1

| Ink composition | Viscosity variation after 7 days |
|---|---|
| Embodiment | Smaller than ±0.5 cP |
| Comparison example | Greater than ±0.5 cP |

What is claimed is:

1. A pigment distribution system comprising a pigment encapsulated by physically adsorbing a diblock copolymer to the pigment, the diblock copolymer being represented by Formula 1 below:

$$-(A)_m-(B)_n-$$ <Formula 1> where -A- denotes a hydrophilic monomer, -B- denotes a hydrophobic monomer, m denotes an integer ranging from 1 to 10, and n denotes an integer ranging from 3 to 30,
wherein hydrophilic monomers of neighboring diblock copolymer chains are crosslinked using a crosslinker.

2. The pigment distribution system of claim 1, wherein the crosslinker is represented by Formula 2 below:

$$X\diagdown\diagup(O\diagdown\diagup)_p X$$ <Formula 2> where X denotes one of an amine group, an acid group, and an epoxy group, and p denotes an integer ranging from 2 to 5.

3. The pigment distribution system of claim 1, wherein the hydrophilic monomer -A- is an acrylic monomer comprising an acid group, an amine group, or an epoxy group.

4. The pigment distribution system of claim 1, wherein the hydrophobic monomer -B- is an acrylic or methacrylic monomer comprising a methyl group, an ethyl group, a phenyl group, or a benzyl group.

5. The pigment distribution system of claim 1, wherein the diblock copolymer has a number average molecular weight in a range of about 6400 to about 17600.

6. The pigment distribution system of claim 1, wherein a hydrophilic group of the diblock copolymer physically adsorbs to the pigment to encapsulate the pigment.

7. The pigment distribution system of claim 1, wherein the pigment is coated with a dispersant, and a hydrophobic group of the diblock copolymer physically adsorbs to the dispersant so as to encapsulate the pigment coated with the dispersant.

8. The pigment distribution system of claim 1, wherein the diblock copolymer has an Am:Bn ratio in a range of 1:3 to 1:10.

9. The pigment distribution system of claim 1, wherein a ratio of the content of the pigment to the diblock copolymer ranges from 1:3 to 1:10.

10. An ink composition to fabricate a color filter, the ink composition comprising:
a pigment encapsulated by physically adsorbing a diblock copolymer to the pigment, the diblock copolymer being represented by Formula 1 below:

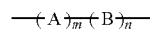

<Formula 1> where -A- denotes a hydrophilic monomer, -B- denotes a hydrophobic monomer, m denotes an integer ranging from 1 to 10, and n denotes an integer ranging from 3 to 30,
wherein hydrophilic monomers of neighboring diblock copolymer chains are crosslinked using a crosslinker.

11. The ink composition of claim 10, further comprising an organic solvent, a binder, a monomer, and an additive.

12. The ink composition of claim 11, wherein the additive comprises at least one selected from the group consisting of a viscosity modifier, a thermal initiator, a leveling agent, and a surfactant.

13. A color filter fabricated using the ink composition of claim 10.

* * * * *